United States Patent
Jurgenson et al.

(10) Patent No.: US 10,068,277 B2
(45) Date of Patent: Sep. 4, 2018

(54) MODES, CONTROL AND APPLICATIONS OF RECOMMENDATIONS AUTO-CONSUMPTION

(71) Applicant: Microsoft Technology Licensing, LLC, Redmond, WA (US)

(72) Inventors: Tom Jurgenson, Tel Aviv (IL); Royi Ronen, Tel Aviv (IL); Elad Ziklik, Modiin-Maccabim-Reut (IL); Oran Brill, Modiin (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 715 days.

(21) Appl. No.: 14/307,058

(22) Filed: Jun. 17, 2014

(65) Prior Publication Data
US 2015/0363863 A1    Dec. 17, 2015

(51) Int. Cl.
| | |
|---|---|
| G06Q 30/06 | (2012.01) |
| H04N 21/466 | (2011.01) |
| G06F 8/60 | (2018.01) |
| H04L 29/06 | (2006.01) |

(52) U.S. Cl.
CPC ........... *G06Q 30/0631* (2013.01); *G06F 8/60* (2013.01); *H04L 63/00* (2013.01); *H04N 21/466* (2013.01)

(58) Field of Classification Search
CPC .. G06Q 30/0631; H04N 21/466; H04L 63/00; G06F 8/60
See application file for complete search history.

(56) References Cited

U.S. PATENT DOCUMENTS

| | | | |
|---|---|---|---|
| 7,970,922 B2 | 6/2011 | Svendsen | |
| 8,260,778 B2 | 9/2012 | Ghatak | |
| 8,296,660 B2 | 10/2012 | Macadaan et al. | |
| 8,671,068 B2 | 3/2014 | Harber et al. | |
| 2003/0101214 A1* | 5/2003 | Kumhyr ............ | G06F 17/30902 709/203 |

(Continued)

OTHER PUBLICATIONS

"Barragans-Martinez et. al., A hybrid content-based and item-based collaborative filtering approach to recommend TV programs enhanced with singular value decomposition, Nov. 15, 2010, Information Sciences, vol. 180, Issue 22, pp. 4290-4311." (Year: 2010).*

(Continued)

*Primary Examiner* — Michael Misiaszek
*Assistant Examiner* — Matthew W Todd
(74) *Attorney, Agent, or Firm* — Workman Nydegger (57) ABSTRACT

A method includes acts for filtering auto consumption recommendations and auto consumption actions. The method includes receiving from a recommendation system, a recommendation of an asset for consumption. The asset for consumption is evaluated in the context of one or more filter rules regarding auto consumption. The filter rules are configured to filter recommended assets from being consumed when certain criteria are met or to permit recommended assets to be consumed when certain criteria are met. As a result, the method includes identifying one or more constraints on how recommended asset should be consumed. The method further includes filtering consumption of the recommended asset based on the one or more constraints.

20 Claims, 6 Drawing Sheets

(56) References Cited

U.S. PATENT DOCUMENTS

| | | | |
|---|---|---|---|
| 2003/0182567 A1* | 9/2003 | Barton | H04H 60/27 |
| | | | 713/193 |
| 2008/0134043 A1 | 6/2008 | Georgis et al. | |
| 2012/0036523 A1* | 2/2012 | Weintraub | H04N 7/173 |
| | | | 725/9 |
| 2012/0059738 A1 | 3/2012 | Stefik | |
| 2012/0207446 A1* | 8/2012 | Jarman | H04N 5/85 |
| | | | 386/239 |
| 2012/0233031 A1* | 9/2012 | Chang | G06F 17/30017 |
| | | | 705/27.1 |
| 2014/0052683 A1 | 2/2014 | Kirkham et al. | |

OTHER PUBLICATIONS

Lehtiniemi, Arto, "Evaluating SuperMusic: Streaming Context-Aware Mobile Music Service", In Proceedings of International Conference on Advances in Computer Entertainment Technology, Dec. 3, 2008, pp. 314-321.

Pouwelse, et al., "TRIBLER: A Social-Based Peer-to-Peer System", In Journal Concurrency and Computation: Practice & Experience—Recent Advances in Peer-to-Peer Systems and Security, vol. 20, Issue 2, Feb. 2008, 12 pages.

Herlocker, et al., "Explaining Collaborative Filtering Recommendations", In Proceedings of ACM Conference on Computer Supported Cooperative Work, Dec. 2, 2000, 11 pages.

* cited by examiner

MODES, CONTROL AND APPLICATIONS OF RECOMMENDATIONS AUTO-CONSUMPTION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Connected computing systems have allowed for delivery of assets (e.g., goods and services such as digital multimedia assets, applications, datasets, etc.) over a network or (tangible physical goods and services, such as books, compact disks, pizzas, etc.) by physical delivery. Some systems are able to predictively suggest or deliver assets. However, such systems require constant user interaction to cause delivery of suggested assets or to fine tune, what assets are delivered, and the delivery method of the assets.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing system. The method includes acts for filtering auto consumption recommendations and auto consumption actions. The method includes receiving from a recommendation system, a recommendation of an asset for consumption. The asset for consumption is evaluated in the context of one or more filter rules regarding auto consumption. The filter rules are configured to filter recommended assets from being consumed when certain criteria are met or to permit recommended assets to be consumed when certain criteria are met. As a result, the method includes identifying one or more constraints on how the recommended asset should be consumed. The method further includes filtering consumption of the recommended asset based on the one or more constraints.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are able receive recommendations of assets from a recommendation engine. The recommendations from the recommendation engine can then be filtered by an auto consumption filter. The auto consumption filter can determine when and how recommended assets should be automatically delivered to a user so as to be able to filter out recommended assets that would otherwise be delivered to a user when certain criteria are met.

The auto consumption filter can implement filter rules to identify assets from recommended assets to be consumed and how the assets should be consumed. The filter rules can be manually defined, learned through machine learning processes, or a combination of both manual and machine learned. Identified assets can then be automatically consumed in the fashion specified by the auto consumption filter or filtered by the filter such that the assets are not automatically consumed, in spite of the fact that the assets have been recommended for consumption.

Figure 1:
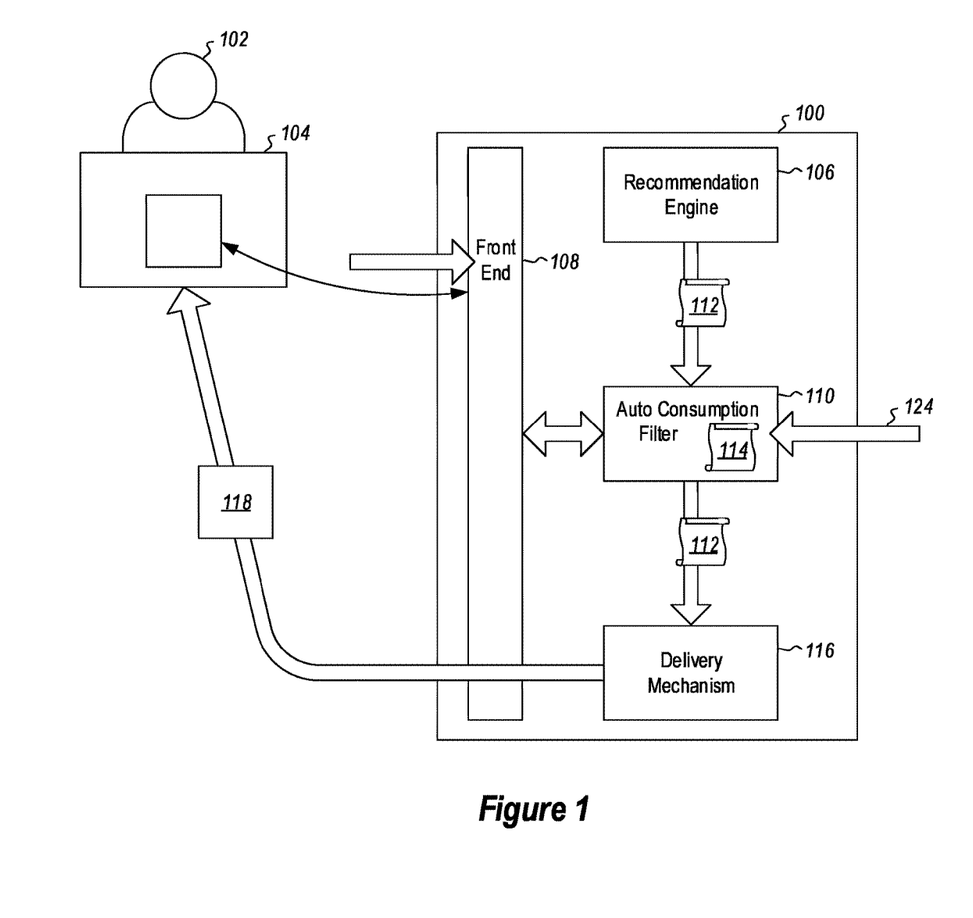
FIG. 1 illustrates an example of a recommendation system and an auto consumption filter.

Referring now to FIG. 1, an example, embodiment is illustrated. FIG. 1 illustrates an asset delivery system 100. The asset delivery system 100 can deliver various assets to a user 102 through a user's device 104. For example, such assets may be video, music, images, data sets, etc. The assets may ordinarily be delivered for automatic consumption by the user.

The delivery system 100 includes a recommendation engine 106 that generates recommendations of assets to be delivered to the user device 104. This may be based on a user's selected criteria, the user's history of interaction with the delivery system 100 through a front-end 108 of the delivery system, a user's past consumption of assets, etc. The user device 104 typically interacts with the front end 108 of the asset delivery system 100 for fine tuning the recommendation engine. The front end 108 may be a set of user interfaces and application programming interfaces that allows user devices to interact with the functionality of the delivery system. Using the front end 108, a user can request assets from an asset delivery mechanism 116, reject assets, fine tune the recommendation engine 106, fine tune the auto consumption filter 110 when appropriate, etc.

While the recommendation engine 106 may be able to identify certain assets that would ordinarily be consumed by the user, there may be various circumstances when a user would not consume the assets. For example, an asset may not be consumed when the user is in a particular location. For example, a user may not wish to automatically consume a musical asset when the user is at church, but may wish to automatically consume the same musical asset when the user is at work. Similarly, a user may not wish to consume a video asset on a device with limited bandwidth and viewing screen associated with a handheld device, but may wish to automatically consume the video asset when using a high-definition device coupled to a big screen television.

Thus, in the example illustrated in FIG. 1, the delivery system 100 further includes an auto consumption filter 110. In the example illustrated in FIG. 1, a recommendation 112 is received at the auto consumption filter 110 from a recommendation engine 106. The auto consumption filter 110 may be coupled to the front end 108 to allow the user 102 to fine tune how the auto consumption filter works as well. The auto consumption filter 110 evaluates the recommendation 112 in the context of a set of rules 114. If certain criteria are met or not met, depending on the criteria, the recommendation 112 will be provided to a delivery mechanism 116 which will cause the asset 118 to be delivered to a user's device 104 through the front end 108 where it will be automatically consumed by the user 102. Alternatively, the recommendation 112 will be filtered out (depending on evaluation of criteria with respect to the asset 118) and the recommendation 112 will not be delivered to the delivery mechanism and the asset will not be automatically provided to the user device 104 and the user will not automatically consume the asset.

Figure 2:
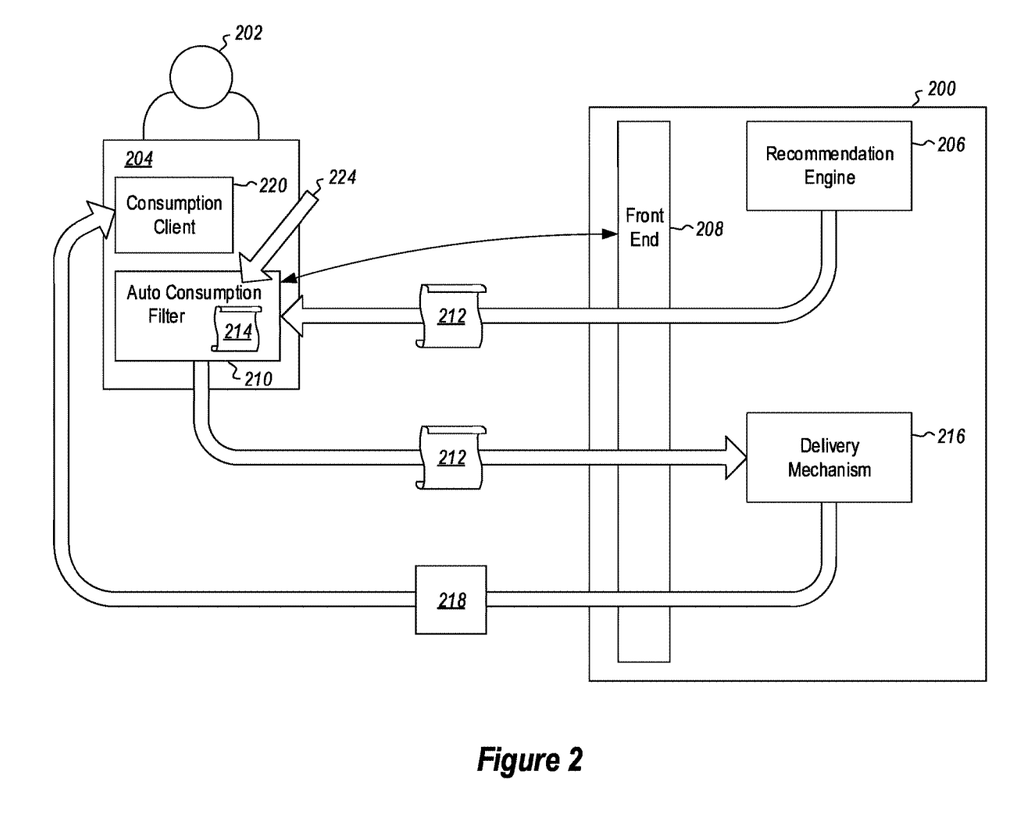
FIG. 2 illustrates another example of a recommendation system and an auto consumption filter.

In some embodiments, the auto consumption filter 110 can be provided external to the delivery system 100. For example, in some embodiments, the auto consumption filter 110 can be provided as an add-on or plug-in to another recommendation system. FIG. 2 illustrates an example of this. In the example illustrated in FIG. 2, an auto consumption filter 210 is an application included on the user's device 204. In this way, the auto consumption filter 210 can be used as an add on such that it can be used with already existing asset delivery systems to provide additional filtering functionality. The auto consumption filter 210 can be almost transparent to the existing system. For example, the auto consumption filter 210 could automatically control what, and how (e.g. when) certain streaming assets are to play. The auto consumption filter 210 could skip, reject, or otherwise control playback of streaming assets.

The auto consumption filter 210 can intercept recommendations 212 from the recommendation system 200 that would ordinarily go to a consumption client 220. The auto consumption filter 210 can then determine, based on criteria defined by rules 214 at the auto consumption filter 210, if the asset 218 should be consumed or not. If the asset 218 should be consumed, based on the criteria, the auto consumption client 220 (e.g. a video or music player client application) can send the recommendation 212 to the delivery mechanism 216 at the delivery system 200, using the front end 208, to cause the asset 218 to be delivered to the auto consumption client 220 at the client device 204, where it will be automatically consumed by the user 202.

Figure 3:
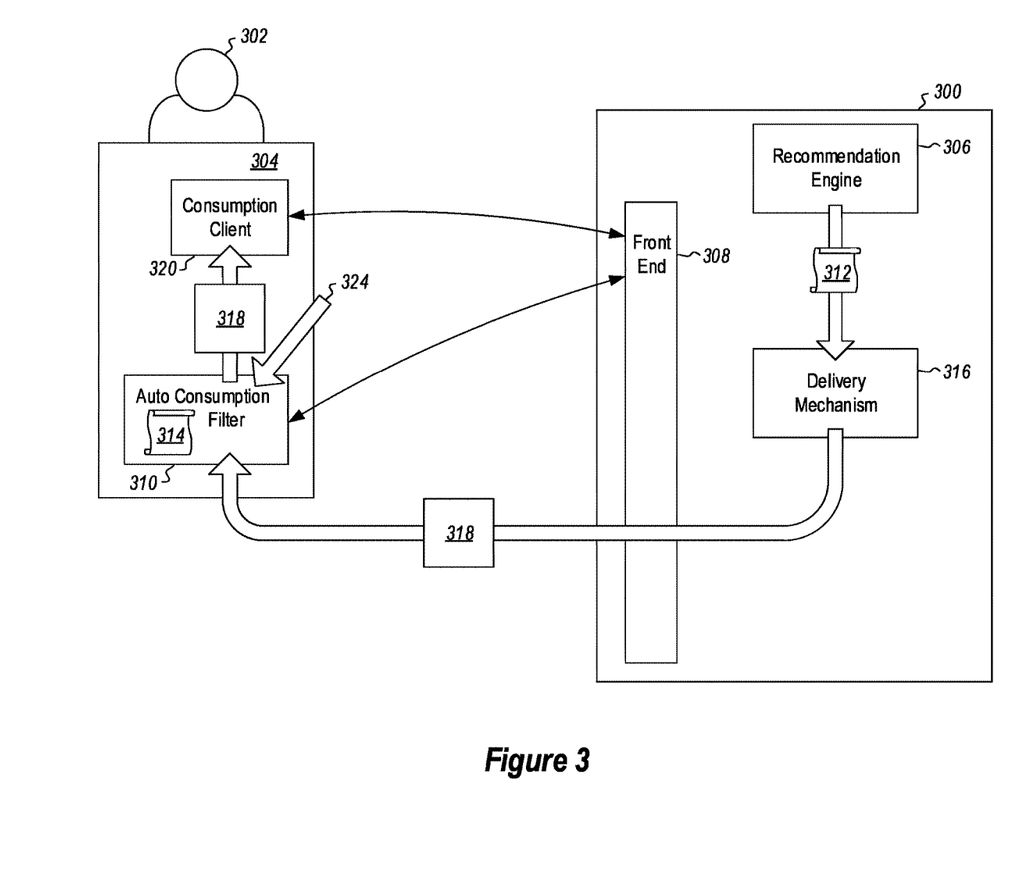
FIG. 3 illustrates another example of a recommendation system and an auto consumption filter.

In an alternative embodiment, as illustrated in FIG. 3, at the recommendation system 300, a recommendation engine 306 may send the recommendation 312 to a delivery mechanism 316 to cause the delivery mechanism 316 to automatically deliver the asset 318 directly to the client device 304 where it is intercepted by the auto consumption filter 310. The asset is evaluated in the context of certain criteria, defined by the rules 314, by the auto consumption filter 310. Based on the evaluation of the criteria, the asset 318 is either delivered to the consumption client 320 for automatic consumption by the user 302, or prevented from being consumed by the user 302. In the example, illustrated, the auto consumption filter 310 is coupled to the front end 308 and is able to interact with the recommendation engine 306 to automatically tune recommendations from the recommendation engine 306 and/or request additional assets from the asset delivery mechanism 316 to replace any filtered assets (e.g. when a continuous stream of assets, such as playing a playlist, is desired). Thus, for example, in rejecting the delivery of the asset, the auto consumption filter 310 may send a "skip" command to the front end 308 to skip an asset in a stream of assets.

Similar embodiments may be implemented to those illustrated in FIGS. 2 and 3, but where the auto consumption filter is implemented on a server that is both external to the recommendation system and the client device (or other device where an asset will be consumed. Such examples are illustrated in FIGS. 4 and 5.

Figure 4:
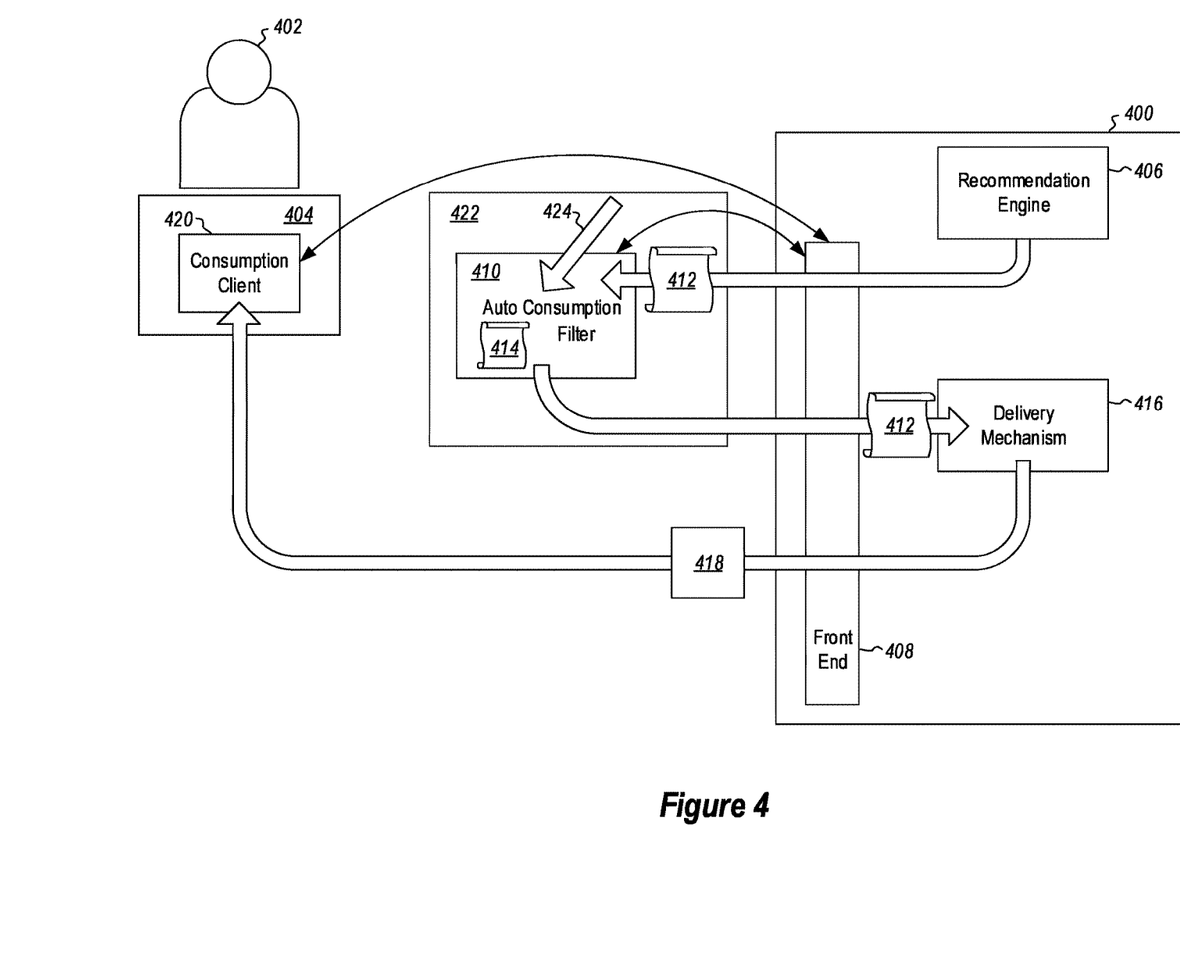
FIG. 4 illustrates another example of a recommendation system and an auto consumption filter.

In particular, FIG. 4 illustrates an example where the recommendation service 400 sends a recommendation 412 using a recommendation engine 406, through a front end 408, to an auto consumption filter 410 at an external server 422. The auto consumption filter 410 evaluates an asset 418 in the context of various criteria codified by the rules 414. If the evaluation determines that the asset 418 should be automatically delivered to the consumption client 420 at the client device 404, then the recommendation 412 will be sent to the delivery mechanism 416 at the recommendation service 400 (or some other service that houses the delivery mechanism 416), through the front end 408, to cause the asset 418 to be delivered to the client device 404 and the consumption client 420 where it will be automatically consumed by the user 402. Alternatively, the auto consumption filter 410 can filter the recommendation 412 based on the evaluation and prevent the asset from being delivered to the client device 404 and the consumption client 420.

Figure 5:
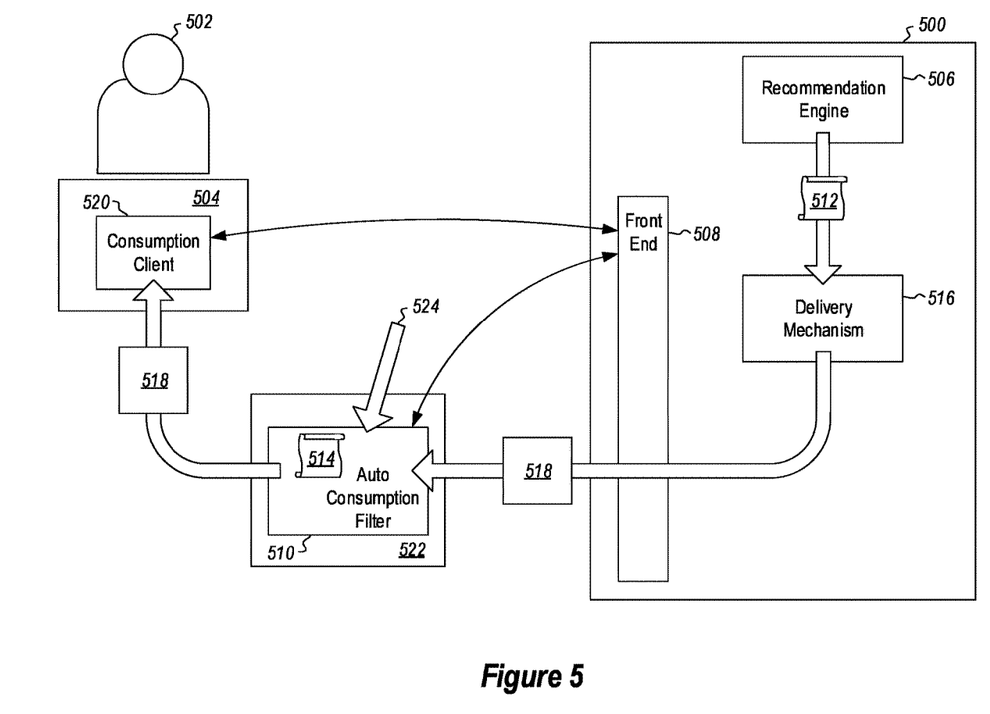
FIG. 5 illustrates another example of a recommendation system and an auto consumption filter.

Referring now to FIG. 5, another example is illustrated. In this example, a recommendation 512 for an asset 518 is sent from a recommendation engine 506, through a front end 508, in a recommendation service 500 to a delivery mechanism 516. The delivery mechanism sends the asset 518, through the front end 508, to an auto consumption filter 510 at an external server 522. The auto consumption filter 510 evaluates the asset 518 in the context of certain criteria enumerated by the rules 514. Depending on the evaluation of the criteria, the asset 518 is either delivered to the client device 504 and to the asset consumption client 520, or filtered and not delivered to the client device 504 and the asset consumption client 520.

Embodiments of the invention can be used in any one of a number of different contexts. For example, embodiments may be implemented in the context of a dedicated media consumption device. For a media device (such as a TV) instead of using the conventional user interaction flow where the user needs to look and select media content, the device selects and plays media content for the user by default as dictated by a back-scene recommender engine in conjunction with an auto consumption filter.

Another embodiment of the invention may be implemented in the context of preinstalled apps on a mobile device. Many smartphones can already recommend apps that a user may like. A recommendation engine may learn what the user likes with high probability, and download apps the user may like, subject to meeting criteria specified in rules of an auto consumption filter, when the user is connected to a Wi-Fi network. Note that, in some embodiments, the app is not installed on the smartphone, but rather just cached locally for a more convenient usage. Also note that a smartphone is just an example, as embodiments can be used with virtually any application marketplaces.

Other embodiments of the invention may be implemented in the context of smart backup of databases. For example, consider the case of a distributed database system. In this example, a distributed database site can be analogized to the users' devices 104, 204, 304, 404, and/or 504. The database site may have certain user properties such as location, size of physical storage etc. The assets may be tables, database files, partitions, etc. that are used by a database. When an action in the site causes it to access a shared resource in the database, the user device, using the example above, is a database site, and the asset is a database resource. Now embodiments can use a recommendation engine and predict what other resources each site is likely to consume. That data can be replicated, subject to meeting the constraints specified by the rules in an auto consumption filter, to cause localization of database assets, and thus better response time.

Other embodiments of the invention may be implemented in the context of recommendation based load balancing. A load balancer can use a recommendation engine, and given an asset (such as a webpage) requested by an end-user, the load balancer can use the recommendation engine to find assets for which similar users also queried. The load balancer can obtain, subject to meeting the constraints specified in the rules at the auto consumption filter, and cache assets even before the end user requests them. This can reduce the time it takes the end user to receive a resource and thus provide a better user experience.

While a number of examples have been illustrated, these should not be viewed as exhaustive. Indeed embodiments may be applied to a number of different scenarios and situations.

The auto consumption filter (e.g. filters 110, 210, 310, 410, and 510) may obtain external input that can be used for evaluation of criteria in the rules (114, 214, 314, 414, and 514). In particular, the Figures illustrate input 124, 224, 324, 424 and 524 being input into the auto consumption filters 110, 210, 310, 410, and 510. This input can be, for example, external inputs being provided to the auto consumption filter. Filtering will be performed based on the external signals. As will be explained in more detail below, the inputs may be used in conjunction with both evaluating criteria and machine based learning to create evaluation rules.

In some embodiments, evaluation rules used by auto consumption filters may be location based. For example, rules may specify in which locations the users prefers to consume recommendations. For example, a rule may specify that if the user is at the supermarket, a user should not consume video assets from a video asset provider. However, if the user is at work, then the user may prefer that video assets be consumed. Inputs, such as GPS devices on a phone, cell-tower triangulation data, Wi-Fi location data and services, and the like may be used to determine where a user (and their device) is located. This information can be used to evaluate rules, but may also be used to observe where a user performs certain actions. Thus, for example, if a user is consistently seen accessing a particular type of recommended asset in a particular location, in the future, the auto consumption filter will allow those types of recommended assets to be automatically consumed by the user at that location, without additional user input.

In some embodiments, evaluation rules used by auto consumption filters may be time and/or data based. For example, an auto consumption filter may have rules indicating that certain assets should only be delivered at certain time. For example, embodiments may learn that a user orders a particular pizza every Sunday. A delivery system can then cause a pizza to be automatically delivered every Sunday.

In some embodiments, evaluation rules used by auto consumption filters may be device based. For example, evaluation rules in an auto consumption filter may have criteria related to which devices a user prefers to auto-consume assets from recommendations. For example, a rule may specify that recommended video assets are to be automatically consumed when using a TV and to not consume assets when the user is using a smartphone. This can be determined through input to an auto consumption filter. Such input, may be, for example, a user agent indication, or some other metadata identifying device type.

In some embodiments, evaluation rules used by auto consumption filters may be asset based. For example, the auto consumption filter may include rules that cause or prevent auto consumption of an asset based on asset characteristics. For example, a rule may specify that recommended assets are automatically consumed when the assets are free, or less than a certain price, but should not be automatically consumed when they are not free or above a certain price.

In some embodiments, evaluation rules used by auto consumption filters may be privacy based. For example, in some embodiments, if consumption of an asset will reveal private information about a user, then a rule at the auto consumption filter may prevent recommended assets from being consumed. For example, some recommendation systems are able to deliver free sample products based on certain recommendations. However, if such products might reveal private information, such as presence of a pregnancy, sickness, or other personal condition, then the automatic delivery may be filtered based on privacy considerations.

Some rules in a set of rules (e.g. rules 114, 214, 314, 414, and/or 514) may be generated by machine learning. In particular, embodiments can learn when a user desires automatic consumption and does not desire automatic consumption. Various machine learning and probabilistic algorithms can be used to make these determinations. Several learning criteria will now be illustrated.

In some embodiments, learning may be based on collaborative signals. For example, learning may be based on similarities between users to decide whether a recommendation needs to be consumed or displayed to the user.

In some embodiments, learning may be based on item characteristics. For example, embodiments may learn at what prices the user agrees to auto consume an asset specified by a recommendation and at what prices an asset should not be auto consumed.

In some embodiments, learning may be based on location. For example, embodiments may learn where the user usually consumes recommended assets. Alternatively or additionally, embodiments may learn where a user just browses recommended assets without consuming them.

In some embodiments, auto consumption filter rules (e.g. rules 114, 214, 314, 414, and/or 514) may be generated in ways that are not automatically learned. The following now illustrates examples of non-auto learned rules.

In some embodiments, a system may generate rules by specifically asking a user for input. The user input can be used to create auto consumption filter rules.

In some embodiments, auto consumption filter rules may be based on the system being configured with business rules. For example, in some embodiments, business rules may be system administrator level rules that set users that frequently return to auto consumption. Alternatively or additionally, some business rules may be administrator level rules that award and allow free assets to users with the most, or a threshold amount of usage of assets. Alternatively or additionally, some business rules may be administrator level rules allowing free samples of popular items to be sent to people who are likely to buy the items. Alternatively or additionally, some business rules may be administrator level rules allowing cold items (i.e. items where consumption has been reduced), or items that have gone cold to be sent to users that are likely to want them. Alternatively or additionally, some business rules may be user level rules that limit auto consumption by total price, total number of items and so on. While not enumerated here, other business rules may be implemented alternatively or additionally. Further, some manually configured business rules may have a default value that is automatically invoked, while other business rules are not invoked until a user specifically invokes them.

In some embodiments, rules may relate to, or be based on privacy considerations. In particular, consumption of recommended assets, or even the learning process for creating rules for consumption decisions is controlled by privacy statements configured by the user. Such considerations may be related to end user age, sensitive nature of assets, ability of private information to be discerned by delivery of assets, etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
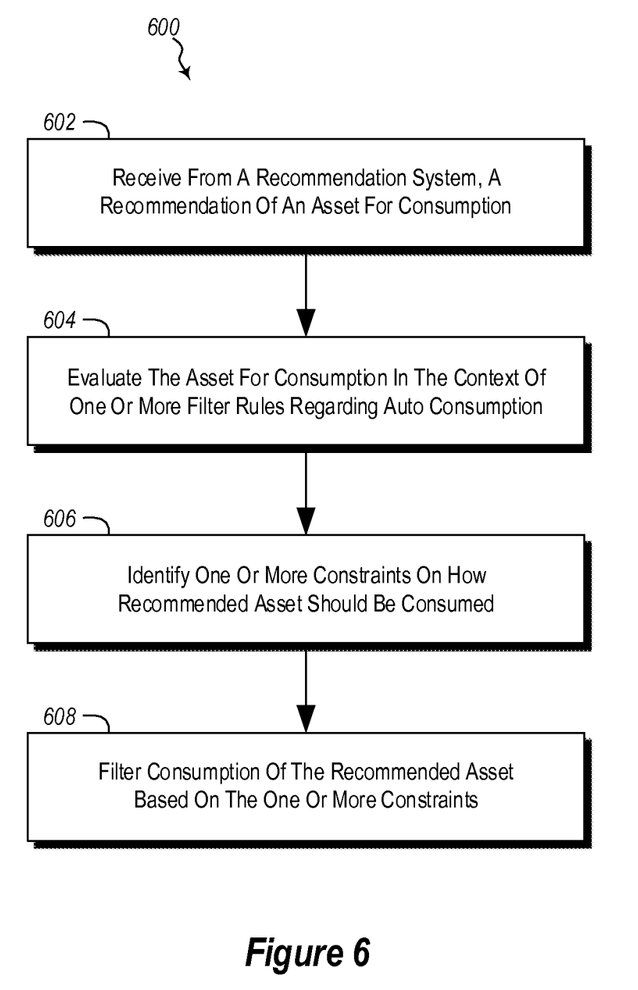
FIG. 6 illustrates a method of filtering auto consumption recommendations and auto consumption actions.

Referring now to FIG. 6, a method 600 is illustrated. The method 600 may be practiced in a computing system. The method 600 includes acts for filtering auto consumption recommendations and auto consumption actions. The method 600 includes receiving from a recommendation system, a recommendation of an asset for consumption (act 602). For example, FIG. 1 illustrates a recommendation 112 being received. FIGS. 2-5 illustrates other examples of recommendations 212, 312, 412 and 512 respectively being received.

The method 600 further includes evaluating the asset for consumption in the context of one or more filter rules regarding auto consumption (act 604). The filter rules are configured to filter recommended assets from being consumed when certain criteria are met or to permit recommended assets to be consumed when certain criteria are met. FIG. 1 illustrates filter rules 114 at the auto consumption filter 110 that can be used to determine if recommended assets should be filtered and prevented from being automatically delivered. Alternate embodiments are also illustrated in FIG. 2-5.

The method 600 further includes identifying one or more constraints on how recommended assets should be consumed (act 606). For example, the constraints may be defined in the filter rules 114.

The method 600 further includes filtering consumption of the recommended asset based on the one or more constraints (act 608). For example, the asset may be blocked from being automatically delivered, or alternatively allowed to be automatically delivered.

The method 600 may be practiced where at least one or more of the filter rules is generated by machine learning. Alternatively or additionally, the method 600 may be practiced where at least one or more of the filter rules is generated by user or administrative selection. Thus, rules, such as rules 114, may be generated manually or automatically as appropriate.

The method 600 may further include receiving additional external input. In some such embodiments, evaluating the asset for consumption in the context of one or more filter rules regarding auto consumption may include evaluating rule criteria with respect to the external input. Such external input may include, for example, location, time, etc.

The method 600 may be practiced where at least one or more of the filter rules comprises privacy considerations. For example, as illustrated above, if delivery of an asset will reveal private information, then a rule may prevent an asset from being delivered if privacy will be compromised.

The method 600 may further include automatically causing the indicated assets to be consumed without user interaction. For example, a song can be automatically played, an item automatically delivered, and app automatically installed, etc.

Various alternative types of assets may be delivered. For example, the method 600 may be practiced where the asset comprises software that is downloaded and installed from a marketplace. Alternatively or additionally, the method 600 may be practiced where the asset comprises a database resource that is consumed by replicating the database resources at one or more distributed sites. Alternatively or additionally, the method 600 may be practiced where the asset comprises a web page that is consumed by caching the web page for anticipated future access.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system comprising one or more processors, a method of recommending and filtering digital assets for automatic consumption at a consumption computing device, the method comprising:
    intercepting a recommendation of a digital asset that is already en route to a consumption computing device, the recommendation having been generated by a recommendation system to be sent directly to the consumption computing device, the consumption computing device being separated from the recommendation system by a computer network;
    in response to intercepting the recommendation of the digital asset, performing at least the following:
        identifying one or more rules associated with automatic consumption of the recommended digital asset by the consumption computing device, the one or more rules including at least one rule relating to use of computing resources associated with automatic consumption of the digital asset at the consumption computing device;
        receiving one or more inputs associated with a context of the digital asset, the context of the digital asset comprising at least one of a current physical status of the consumption computing device or one or more attributes of the recommended digital asset; and
        based at least on an analysis of the recommended digital asset in view of the one or more identified rules and the one or more received inputs, delivering the recommended digital asset to the consumption computing device for automatic consumption, wherein automatic consumption comprises performing at least one of the following without further user input at the consumption computing device associated with interacting with the digital asset:
            playing audio associated with the digital asset at the consumption computing device, or
            playing video associated with the digital asset at the consumption computing device.

2. The method of claim 1, wherein at least one of the one or more rules is generated by machine learning.

3. The method of claim 1, wherein at least one of the one or more rules is generated by user or administrative selection.

4. The method of claim 1, wherein at least one of the one or more rules comprises a privacy consideration.

5. The method of claim 1, wherein the recommended digital asset comprises software that is consumed at the consumption computing device by being downloaded and installed from a marketplace.

6. The method of claim 1, wherein the recommended digital asset comprises a database resource that is consumed at the consumption computing device by replicating the database resources.

7. The method of claim 1, wherein the recommended digital asset comprises a web page that is consumed at the consumption computing device by caching the web page for anticipated future access.

8. A computing system for recommending and filtering digital assets for automatic consumption at a consumption computing device, the system comprising:
  one or more processors; and
  one or more computer readable media, wherein the one or more computer readable media comprise computer executable instructions that when executed by at least one of the one or more processors cause the system to perform the following:
    intercept a recommendation of a digital asset that is already en route to a consumption computing device, the recommendation having been generated by a recommendation system to be sent directly to the consumption computing device, the consumption computing device being separated from the recommendation system by a computer network;
    in response to intercepting the recommendation of the digital asset, perform at least the following:
      identify one or more rules associated with automatic consumption of the recommended digital asset by the consumption computing device, the one or more rules including at least one rule relating to use of computing resources associated with automatic consumption of the digital asset at the consumption computing device;
      receive one or more inputs associated with a context of the digital asset, the context of the digital asset comprising at least one of a current physical status of the consumption computing device or one or more attributes of the recommended digital asset; and
      based at least on an analysis of the recommended digital asset in view of the one or more identified rules and the one or more received inputs, delivering the recommended digital asset to the consumption computing device for automatic consumption, wherein automatic consumption comprises performing at least one of the following without further user input at the consumption computing device associated with interacting with the digital asset:
        playing audio associated with the digital asset at the consumption computing device, or
        playing video associated with the digital asset at the consumption computing device.

9. The computing system of claim 8, wherein at least one of the one or more rules is generated by machine learning.

10. The computing system of claim 9, wherein the machine learning comprises use of a collaborative signal based on digital asset consumption by a plurality of users.

11. The computing system of claim 8, wherein at least one of the one or more rules is generated by user or administrative selection.

12. The computing system of claim 8, wherein at least one of the one or more rules comprises privacy considerations.

13. The computing system of claim 8, wherein the recommended digital asset comprises software that is consumed at the consumption computing device by being downloaded and installed from a marketplace.

14. The computing system of claim 8, wherein the recommended digital asset comprises a database resource that is consumed at the consumption computing device by replicating the database resources.

15. The computing system of claim 8, wherein the recommended digital asset comprises a web page that is consumed at the consumption computing device by caching the web page for anticipated future access.

16. The computing system of claim 8, wherein the consumption computing device comprises the computing system.

17. The computing system of claim 8, wherein the context of the digital asset comprising the current physical status of the consumption computing device comprises one or more of:
  a physical location of the consumption computing device,
  a device type of the consumption computing device,
  a screen size or type of the consumption computing device, or
  a network connection type of the consumption computing device.

18. The computing system of claim 8, wherein the context of digital asset comprising the one or more attributes of the recommended digital asset comprises one or more of:
  a data type of the recommended digital asset,
  content of recommended digital asset, or
  a privacy concern relating to the recommended digital asset.

19. The computing system of claim 8, wherein the one or more inputs also comprise one or more of a time of day or a date.

20. One or more physical computer readable storage media, wherein the one or more computer readable media comprise computer executable instructions that when executed by one or more processors cause the following to be performed:
  intercept a recommendation of a digital asset that is already en route to a consumption computing device, the recommendation having been generated by a recommendation system to be sent directly to the consumption computing device, the consumption computing device being separated from the recommendation system by a computer network;
  in response to intercepting the recommendation of the digital asset, performing at least the following:
    identify one or more rules associated with automatic consumption of the recommended digital asset by the consumption computing device, the one or more rules including at least one rule relating to use of computing resources associated with automatic consumption of the digital asset at the consumption computing device;
    receive one or more inputs associated with a context of the digital asset, the context of the digital asset comprising at least one of a current physical status of the consumption computing device or one or more attributes of the recommended digital asset; and
    based at least on an analysis of the recommended digital asset in view of the one or more identified rules and the one or more received inputs, delivering the recommended digital asset to the consumption computing device for automatic consumption, wherein automatic consumption comprises performing at least one of the following without further user input at the consumption device associated with interacting with the digital asset:

playing audio associated with the digital asset at the consumption computing device, or playing video associated with the digital asset at the consumption computing device.

* * * * *